Nov. 15, 1938.  H. J. LOFTIS  2,136,555
ELECTRICAL EQUIPMENT MOUNTING
Filed Dec. 18, 1936   2 Sheets-Sheet 1
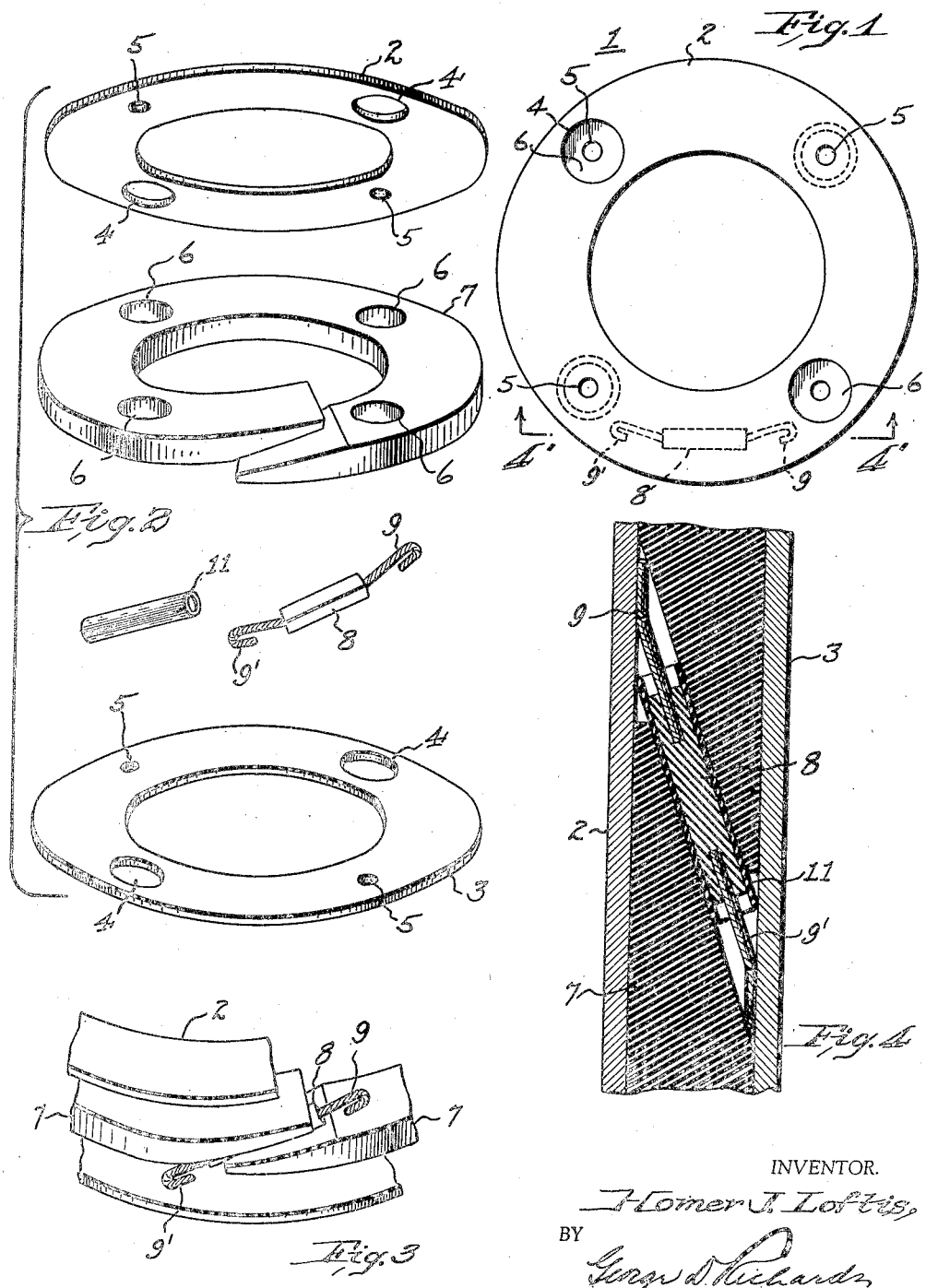

Nov. 15, 1938.    H. J. LOFTIS    2,136,555
ELECTRICAL EQUIPMENT MOUNTING
Filed Dec. 18, 1936    2 Sheets-Sheet 2
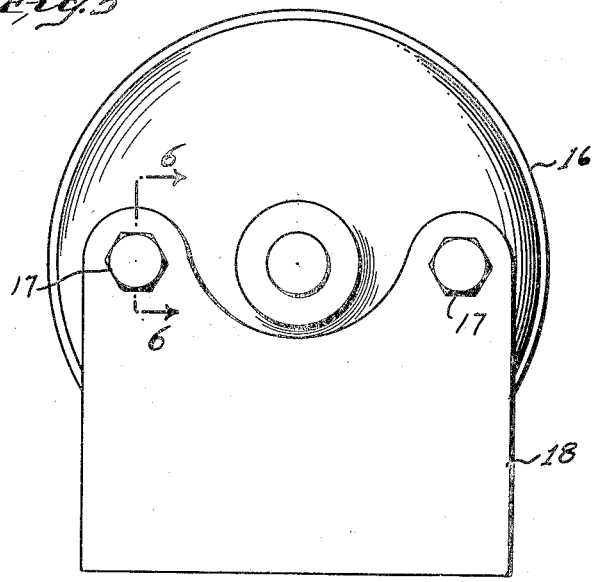
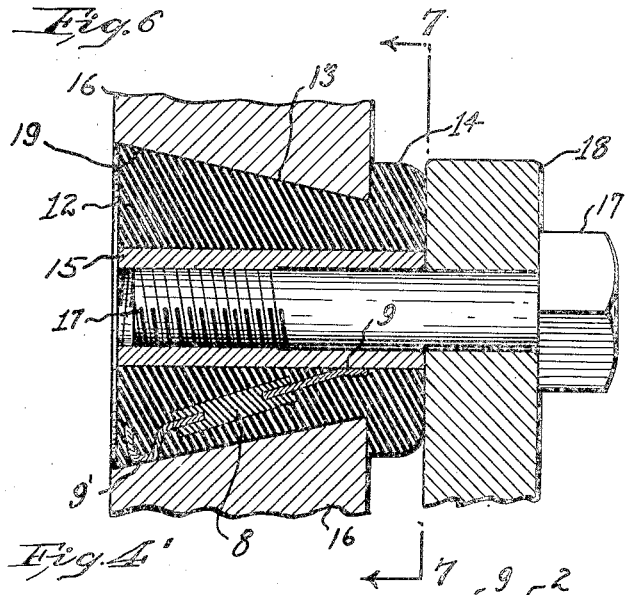
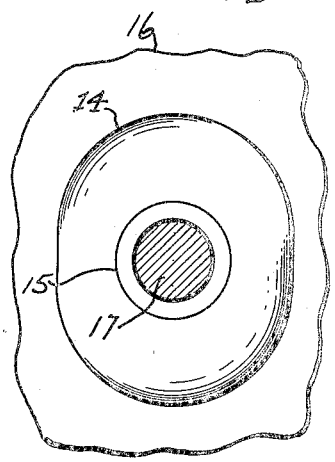
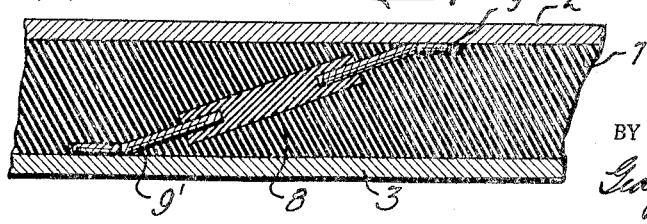
INVENTOR.
Homer J. Loftis,
BY
ATTORNEY.

Patented Nov. 15, 1938

2,136,555

UNITED STATES PATENT OFFICE 2,136,555

ELECTRICAL EQUIPMENT MOUNTING

Homer J. Loftis, Ironton, Ohio, assignor to Henrite Products Corporation, Ironton, Ohio, a corporation of Ohio Application December 18, 1936, Serial No. 116,471

2 Claims. (Cl. 175—264)

This invention relates, generally, to mountings for electrical machinery and equipment such as motors, and the invention has reference, more particularly, to a novel static dissipating resilient mounting for such electrical equipment.

In order to reduce vibration and noise of electric motors and other electrical equipment, the tendency today is to employ rubber or similar resilient mountings that serve to absorb vibration and noise of the equipment. However, such rubber mountings being of an electrical insulating nature, thoroughly insulate the equipment from ground so that static electricity, normally produced through movement of parts such as belts and the like of the equipment, cannot escape to ground which is highly undesirable inasmuch as the presence of static electricity not only interferes with or prevents the proper operation of the equipment but is also apt to cause serious fires as well as shocks to persons handling the equipment. As a result of this objectionable feature of rubber mountings, it has been the tendency in the past to provide a dead short circuit between the motor or other equipment and the grounded base supporting the rubber mounting. When using such a short to the base, such base should be of semi-insulating nature such as wood. This is because it is necessary to have a suitable electrical resistance between the motor or equipment and ground, which resistance will be of sufficient magnitude to withstand the voltage break-down test of the equipment. In other words, while it is necessary to provide an escape for static, the equipment must be insulated against shorting of the power supply, and in the case of a motor designed for a 1500 volt, 60 cycle break-down test, for example, the electrical resistance to ground should withstand this voltage.

The principal object of the present invention is to provide a motor or other electrical equipment mounting that is not only resilient for absorbing noise and shocks, but which also serves to dissipate static electricity, while at the same time providing a proper electrical insulation for the equipment supported thereby to prevent the breakdown of the equipment due to shorting of the power supply through the mounting.

Another object of the present invention lies in the provision of a novel electrical equipment mounting that consists essentially of rubber having a solid resistor embodied therein and provided with flexible connections extending to the electrically conducting surfaces of the mounting for the purpose of conveying static electricity from the equipment to ground, said resistor being of such magnitude as to withstand the breakdown voltage of the equipment.

Other objects of this invention, not at this time more particularly enumerated, will be clearly understood from the following detailed description of the same.

The invention is clearly illustrated in the accompanying drawings, in which:

Fig. 1 is a plan view of a mounting embodying the principles of the present invention.

Fig. 2 is a perspective view illustrating the manner of assembling the several parts which go to make up the novel mounting of the present invention.

Fig. 3 is a fragmentary view similar to Fig. 2 but shows the parts assembled though in somewhat slightly spaced relation.

Fig. 4 is a sectional view showing the assembled parts prior to vulcanization, i. e. appliance of heat and pressure.

Fig. 4' is a view taken along line 4'—4' of Fig. 1 showing the completed mounting after the vulcanization thereof.

Fig. 5 shows a motor supported by plug type mountings embodying the principles of the present invention.

Fig. 6 is an enlarged sectional view taken along line 6—6 of Fig. 5, and Fig. 7 is a sectional view taken along line 7—7 of Fig. 6.

Similar characters of reference are employed in said views, to indicate corresponding parts.

Referring now to Figs. 1 to 4' of the drawings, the reference numeral 1 designates the novel equipment mounting of this invention as a whole, the said mounting being shown as having top and bottom flat metal plates 2 and 3 which plates may be brass plated metal rings, being illustrated as of annular shape. The top plate 2 is provided with diametrically arranged circular apertures 4 and additional smaller apertures 5 are also arranged diametrically on a diameter extending at right angles to that of apertures 4. Apertures 4 are of such size as to accommodate the heads of bolts or other fastening means which heads are received within the aligned circular recesses 6 provided in the annular resilient body 7 of the mounting. The heads of the bolts engage against the bottom plate 3 and have their shanks projecting through apertures 5 therein for threaded engagement with the mounting support. Similarly the bottom plate 3 is provided with apertures 4 for receiving bolt heads or other fastening means that lie within additional recesses 6 formed in the body of member 7 and engage the top plate 2, the shanks of which bolts extend through the apertures 5 of the top plate for securing the motor casing to its mounting.

The annular resilient body 7 of the mounting is composed of vulcanized rubber and has imbedded therein a rigid resistor 8 comprising a moulded body consisting of an intermixture of an electrically conducting material or materials such as graphitic carbon and/or carbon black and non-conducting materials such as silica, feldspar or mica held together by a suitable binder such as a phenolic condensation binder. The resistor 8 is provided with flexible metallic terminals or terminal leads 9 and 9' that have their inner end portions directly moulded into the body of the resistor 8 while the outer end portions of the terminals 9 and 9' are preferably looped and positioned to directly contact the top and bottom plates 2 and 3, the looping of these terminals serving to provide a long electrical contact with plates 2 and 3. This engagement is readily accomplished by locating the resistor 8 in an inclined position within the resilient body 7 as illustrated in the drawings.

In making up the novel mounting of the present invention, a strip of uncured rubber of proper length to make a circle with a mean diameter equal to that of plates 2 and 3, as shown in Fig. 2, is bent into annular shape with its ends closely adjacent and is then laid upon the bottom plate 3. This strip of uncured rubber which is to form the body 7 of the mounting is unvulcanized and has all the ingredients therein including sulphur, etc., preparatory to vulcanization. Between the ends of the strip 7 is placed the resistor 8 in an inclined position with its end portions 9 and 9' lying above and below the strip 7 as shown in Fig. 3. If desired, the ends of the rubber strip may be beveled to better accommodate the resistor 8 therebetween. The top plate 2 is then placed upon the strip or body 7 as shown in Fig. 3 and Fig. 4 preparatory to vulcanization. Before inserting the resistor 8 between the ends of the strip 7 the resistor is preferably covered with a soft rubber tape or tube 11 that preferably projects beyond the ends of the rigid body of resistor 8 as shown in Figs. 3 and 4. This rubber tube or tape serves to prevent the resistor from shorting out in case it is squeezed against one plate in the moulding or vulcanizing process.

The whole assembly is now vulcanized using heat and pressure, whereby the completed mounting shown in Figs. 1 and 4' is produced. As shown in these figures the resistor 8 is directly molded into the resilient body 7 of the mounting with the looped leads 9 and 9' engaging the plates 2 and 3, respectively. Owing to the flexibility of these leads, they allow ready movement of plates 2 and 3 toward and from each other in use, while at the same time maintaining electrical contact between these plates for enabling the escape of static electricity therebetween. The resistor 8 nevertheless serves to prevent the discharge of power currents between the plates. The resistor 8 is of fairly high resistance of the order of 200,000 to 1,000,000 ohms. In a typical installation, where a 1500 volt flash test is required between the two plates 2 and 3 a resistor 8 of 700,000 ohms resistance has been found very satisfactory.

In the form of the invention shown in Figs. 5 to 7, a plug type mounting is illustrated. This mounting comprises a rubber sleeve 12 having a tapered external surface 13 that tapers down to a head portion 14. The resistor 8 is molded directly into the body or sleeve 12 just as in the case of the structure of the preceding figures, and the looped ends or terminals 9 and 9' of the resistor are adapted to engage a metal sleeve 15 and the motor frame 16, respectively, for conducting static from the frame 16 to the sleeve 15. Sleeve 15 is moulded to sleeve 12 and is internally threaded for receiving a bolt 17 that is carried by the grounded motor pedestal 18. Thus, static electricity passes from the motor through resistor 8 and through sleeve 15 and bolt 17 to be grounded by pedestal 18. In installing the plug type of mountings, the same are pushed through the tapered holes 19 provided in the motor frame or casing 16 whereupon the tapered construction of the sleeve 12 and hole 19 serve to retain the mountings in place. Four such mountings would ordinarily be used for supporting a motor or other equipment.

Considering the broader aspect of my invention, it will be seen that this resides in the novel incorporation and disposition of an elongated, relatively rigid electrical resistor 8 in the compressible body 7 in Figs. 1 to 4' and 12 in Figs. 5 to 7, the resistor being disposed with its longitudinal axis inclined at an acute angle to the adjacent opposite surfaces of said body, as shown in Figs. 4' and 6, whereby the relatively rigid resistor is capable of a slight rotational movement bodily to accommodate itself to occurring slight changes in the shape of said body due to the application of varying forces normal to the opposite surfaces of said body where the resistor is located. Such slight changes in the shape of the compressible body are caused by the compressible body 7 in Figs. 1 to 4' being compressed more or less between the associated plates 2 and 3, and by the compressible body 12 in Figs. 5 to 7 being compressed more or less between the associated sleeve 15 and the motor frame 16.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. As an article of manufacture, a compressible body of electrical insulating material and an elongated solid and rigid electrical resistor incorporated in said body and provided with flexible terminals extending endwise therefrom respectively to adjacent opposite surfaces of said body, said resistor being disposed with its longitudinal axis inclined at an acute angle to said surfaces whereby said resistor is capable of at least a relatively slight rotational movement bodily to accommodate itself to relatively slight changes in the shape of said body occurring due to the application of varying forces normal to the opposite surfaces of said body where said resistor is located.

2. An electrical equipment mounting comprising an annular yieldable rubber body having a solid resistor moulded therein and face plates moulded to the opposed surfaces of said body, said resistor having terminal leads contacting with said face plates and serving to transmit static electricity therebetween while preventing the passage of power currents.

HOMER J. LOFTIS.